United States Patent
Shi et al.

(10) Patent No.: US 10,405,347 B2
(45) Date of Patent: Sep. 3, 2019

(54) METHOD AND APPARATUS FOR LISTENING BASED TRANSMISSION

(71) Applicant: Telefonaktiebolaget LM Ericsson (publ), Stockholm (SE)

(72) Inventors: Cong Shi, Beijing (CN); Gen Li, Beijing (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 59 days.

(21) Appl. No.: 15/028,871

(22) PCT Filed: Aug. 6, 2015

(86) PCT No.: PCT/CN2015/086224
§ 371 (c)(1),
(2) Date: Apr. 12, 2016

(87) PCT Pub. No.: WO2017/020293
PCT Pub. Date: Feb. 9, 2017

(65) Prior Publication Data
US 2017/0171887 A1  Jun. 15, 2017

(51) Int. Cl.
*H04W 74/08* (2009.01)
*H04W 72/04* (2009.01)
(Continued)

(52) U.S. Cl.
CPC ....... *H04W 74/0816* (2013.01); *H04W 16/14* (2013.01); *H04W 72/046* (2013.01); *H04W 16/28* (2013.01)

(58) Field of Classification Search
None
See application file for complete search history.

(56) References Cited

U.S. PATENT DOCUMENTS

| 5,732,075 A | * | 3/1998 | Tangemann | H04W 16/28 342/367 |
| 7,321,580 B1 | * | 1/2008 | Ramanathan | H04W 74/0816 370/252 |

(Continued)

FOREIGN PATENT DOCUMENTS

| CN | 101207535 A | 6/2008 |
| CN | 101686078 A | 3/2010 |

(Continued)

OTHER PUBLICATIONS

International Search Report and the Written Opinion for Application No. PCT/CN2015/086224, dated May 11, 2016, 8 pages.

(Continued)

*Primary Examiner* — Brian S Roberts
*Assistant Examiner* — Cassandra L Decker
(74) *Attorney, Agent, or Firm* — Nicholson De Vos Webster & Elliott LLP (57) ABSTRACT

Embodiments of the present disclosure relate to a method for listening-based transmission. The method is performed at a communications device of a first type with a plurality of beams and operable on an unlicensed spectrum. The method comprises identifying a beam direction for a communications device of a second type when there is data directed to the communications device of the second type and obtaining a backoff counter for the identified beam direction. The method also comprises selecting at least one beam direction for listening during. The beam in each of the at least one beam direction covers at least one communications device of the second type having data directed thereto. The method further comprises scheduling transmission to a communications device of the second type in the identified beam direction when the backoff counter corresponding to that (Continued)

beam direction reaches a certain threshold. Embodiments also relate to corresponding apparatus.

13 Claims, 6 Drawing Sheets

(51) Int. Cl.
*H04W 16/14* (2009.01)
*H04W 16/24* (2009.01)
*H04W 16/28* (2009.01)

(56) References Cited

U.S. PATENT DOCUMENTS

| | | | | |
|---|---|---|---|---|
| 2004/0002357 | A1* | 1/2004 | Benveniste | H04W 72/12 455/550.1 |
| 2008/0026797 | A1* | 1/2008 | Nanda | H01Q 1/246 455/562.1 |
| 2010/0172296 | A1* | 7/2010 | Singh | H04W 84/18 370/328 |
| 2012/0008490 | A1 | 1/2012 | Zhu | |
| 2012/0163218 | A1* | 6/2012 | Kim | H04W 74/08 370/252 |
| 2012/0178457 | A1* | 7/2012 | Liao | H04W 76/027 455/437 |
| 2013/0084908 | A1* | 4/2013 | Joo | H04W 16/28 455/509 |
| 2014/0044044 | A1* | 2/2014 | Josiam | H04W 24/10 370/328 |
| 2014/0247797 | A1* | 9/2014 | Monzen | H04L 1/0015 370/329 |
| 2016/0192395 | A1* | 6/2016 | Yoo | H04W 74/0808 370/329 |
| 2016/0316470 | A1* | 10/2016 | Wong | H04L 27/0006 |
| 2017/0019909 | A1* | 1/2017 | Si | H04W 76/048 |

FOREIGN PATENT DOCUMENTS

| | | |
|---|---|---|
| CN | 102884857 A | 1/2013 |
| CN | 102958186 A | 3/2013 |
| JP | 2013074516 A | 4/2013 |
| KR | 20120079741 A | 7/2012 |
| WO | 2013/155336 A1 | 10/2013 |

OTHER PUBLICATIONS

International Preliminary Report on Patentability for Application No. PCT/CN2015/086224, dated Feb. 15, 2018, 5 pages.
Notice of Reasons for Rejection from foreign counterpart Japanese Patent Application No. 2018-506191, dated Aug. 14, 2018, 7 pages.
Extended European Search Report for Application No. 15900067, dated Jan. 24, 2019, 15 pages.
Communication pursuant to Article 94(3) EPC for European Application No. 15900067.8, dated Jun. 28, 2019, 13 pages.
Thorpe, C., et al., "A Survey of Adaptive Carrier Sensing Mechanisms for IEEE 802.11 Wireless Networks," IEEE Communications Surveys & Tutorials, vol. 16 (3), 2014, pp. 1266-1293.

* cited by examiner

METHOD AND APPARATUS FOR LISTENING BASED TRANSMISSION

CROSS-REFERENCE TO RELATED APPLICATIONS

This application is a National stage of International Application No. PCT/CN2015/086224, filed Aug. 6, 2015, which is hereby incorporated by reference.

TECHNICAL FIELD

The non-limiting and exemplary embodiments of the present disclosure generally relate to the technical field of wireless communications, and specifically to a method and apparatus for transmission based on beam specific listening in a wireless network utilizing beamforming and an unlicensed spectrum.

BACKGROUND

This section introduces aspects that may facilitate better understanding of the disclosure. Accordingly, the statements of this section are to be read in this light and are not to be understood as admissions about what is in the prior art or what is not in the prior art.

Mobile broadband will continue to drive the demand for a higher overall traffic capacity and a higher achievable end-user data rate in radio access networks. Several scenarios in the future will require data rates of up to 10 Gbps in local areas. Thus, an objective to be realized by next generation networks, which may be referred to as the fifth generation (5G) systems, is to meet such demand for the high traffic capacity and the high end-user date rate.

As one key technique, high-gain beamforming, typically implemented with array antennas, may be used in the next generation networks to mitigate the increased path loss at higher frequencies. Moreover, the next generation networks are also expected to be operating on the unlicensed (shared) spectrum in addition to the traditional licensed (exclusive) spectrum. It has been agreed to study Licensed-Assisted Access (LAA) technologies in the 3GPP at RP-141664. This LAA framework builds on carrier aggregation solutions introduced in LTE Release-10 to access the additional bandwidth in the unlicensed spectrum. Accordingly, a support for coexistence of the licensed and unlicensed spectrums is needed to enable spectrum sharing between different operators or systems. Currently, the Listen-Before-Talk (LBT) mechanism is the most flexible way to achieve this coexistence support, since it is a distributed mechanism such that there is no need for exchanging information between different operators or systems, which is costly and complicated.

The LBT mechanism is commonly used in Wi-Fi systems. Wi-Fi works with no physical wired connection between a sender and a receiver by using radio frequency (RF) technology. In Wi-Fi systems, an access point usually has a range of about 20 meters indoors and a greater range outdoors. Wi-Fi systems are defined as wireless local area network (WLAN) products based on Institute of Electrical and Electronics Engineers (IEEE) 802.11 standards.

Figure 1:
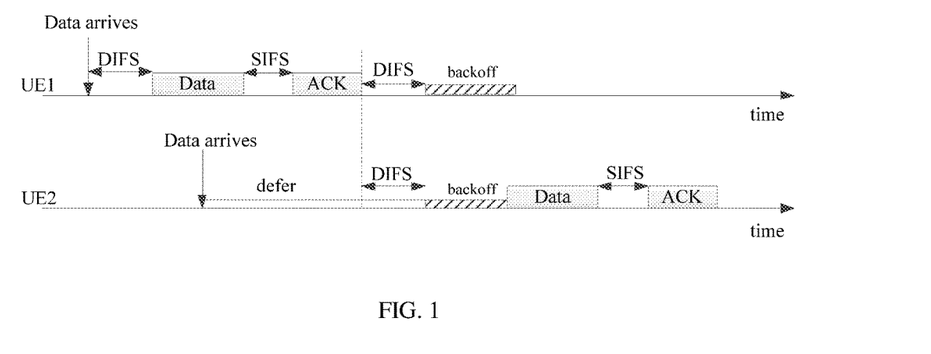
FIG. 1 illustrates the LBT mechanism used in Wi-Fi systems.

According to IEEE 802.11 standards, the basic media access control (MAC) protocol employs a Carrier Sense Multiple Access with Collision Avoidance (CSMA/CA)-based LBT mechanism. FIG. 1 illustrates the LBT mechanism used in the current Wi-Fi systems. As illustrated, the same protocol is applied by all stations in both downlink (DL) and uplink (UL). A station, e.g. a user equipment (UE) that wishes to transmit a packet first senses the medium. If the medium is sensed idle for a certain time (the so-called Distributed Inter Frame Space (DIFS), e.g. 50 µs for 802.11b), the packet is then transmitted. If the medium is busy, the station defers until the medium is sensed idle. When this occurs, the station does not transmit immediately, since it may lead to collisions if more than one station was deferring. Instead, the station sets a backoff timer to a random value, and does not transmit until this timer has expired. The backoff timer is only decreased when the medium is sensed idle. Whenever the medium is sensed busy, a deferment state is entered where the backoff timer is not decreased. When the backoff timer expires, the packet will be transmitted. If the packet is successfully received by a receiving station, it responds with an acknowledgement to the transmitting station. The acknowledgement is sent a Short Inter Frame Space (SIFS), e.g. 10 µs for 802.11b, after the packet is received. Since SIFS<DIFS, no other station will access the medium during this time. If no acknowledgement is received by the transmitting station, because either the packet itself or the acknowledgement was lost, the transmitting station generates a new backoff, and retransmits the packet when the backoff timer has expired. Even if the packet was successfully acknowledged, the transmitter will generate a backoff and wait for it to expire before transmitting the next packet. The backoff time is measured in units of slot times, which for 802.11b are 20 µs long.

The current Wi-Fi systems are operating at low frequencies and thus both the "listen" and "talk" can be omnidirectional. Therefore, the key objective of the LBT in Wi-Fi systems is to avoid interference between simultaneous data transmission. Practical application results show that the current LBT mechanism works well in Wi-Fi systems.

However, if the CSMA/CA based LBT is applied in the next generation networks at higher frequencies, due to directional transmission with beamforming, there will be some problems which do not exist in Wi-Fi systems. Therefore, a more efficient and effective LBT mechanism is needed for data transmission in the next generation networks with multiple beams and operable on the unlicensed spectrum, e.g. the LAA networks.

SUMMARY

Various embodiments of the disclosure aim at providing an efficient and effective LBT mechanism for use in a wireless network that utilizes beamforming and the unlicensed spectrum. Other features and advantages of embodiments of the disclosure will also be understood from the following description of specific embodiments when read in conjunction with the accompanying drawings, which illustrate the principles of embodiments of the present disclosure.

In a first aspect of the present disclosure, there is provided a method for listening-based transmission. The method is performed at a communications device of a first type with a plurality of beams and operable on an unlicensed spectrum. Particularly, the method comprises identifying a beam direction for a communications device of a second type when there is data directed to the communications device of the second type and obtaining a backoff counter for the identified beam direction. The method further comprises selecting at least one beam direction for listening. During the listening, the backoff counter corresponding to the selected at least one beam direction may be changed. The beam in each of the selected at least one beam direction covers at least one communications device of the second type that has data directed thereto. Then, the method comprises scheduling transmission to a communications device of the second type in the identified beam direction when the backoff counter corresponding to that beam direction reaches a certain threshold.

By virtue of the method according to the first aspect of the present disclosure, the networks or systems with a plurality of beams, i.e. utilizing beamforming and operable on the unlicensed spectrum may perform beam-specific listening instead of node-specific listening and thereby can make the best use of transmission opportunities in different beam directions without modifying too much of the traditional LBT protocol.

In an embodiment, the backoff counter may be obtained for the identified beam direction by generating the backoff counter for the identified beam direction, if no backoff counter exists for that beam direction and otherwise, retrieving the existing backoff counter for the identified beam direction.

In a further embodiment, the method may further comprise dividing communications devices of the second type connected to the communications device of the first type into at least one group each corresponding to a beam direction, before identifying the beam direction for the communications device of the second type. In this embodiment, the beam direction may be identified for the communications device of the second type by determining the group to which the communications device of the second type belongs.

In another embodiment, the at least one beam direction for listening may be selected based further on priorities of beam directions each covering at least one communications device of the second type.

In yet another embodiment, the priority of a beam direction may be determined based on any one or any combination of: a quality of service requirement of a group of communications devices of the second type corresponding to that beam direction; historical scheduling information for the group of communications devices of the second type corresponding to that beam direction; a channel quality of the beam in that beam direction; a value of the backoff counter corresponding to that beam direction; and a time when the communications device of the second type in that beam direction requests data.

According to the above embodiment, the beam directions may be selected for listening in consideration of multiple factors in various aspects.

In yet another embodiment, the method may further comprise judging whether a number of pending beam directions each covering at least one communications device of the second type that has data directed thereto, is greater than a number of receiving radio frequency chains of the communications device of the first type, before selecting the at least one beam direction for listening. In this embodiment, if the number of pending beam directions is greater than the number of receiving radio frequency chains, then a number of the selected at least one beam direction is equal to the number of receiving radio frequency chains; otherwise the number of the selected at least one beam direction is equal to the number of pending beam directions.

According to this embodiment, the beam directions can be selected for listening within the limit of receiving radio frequency chains available at the transmitter side, i.e. the communications device of the first type, so as to take full advantage of the available radio resources.

In yet another embodiment, the method may further comprise obtaining a deferring time period for a beam direction of the selected at least one beam direction by performing virtual carrier sensing, if the number of pending beam directions is greater than the number of the receiving radio frequency chains. During the deferring time period, the listening for that beam direction is suspended. Then, it may be switched to listen to another beam direction among at least one unselected beam direction each covering at least one communications device of the second type that has data directed thereto during at least the deferring time period. The other beam direction has a highest priority among the at least one unselected beam direction.

In this way, when the transmission in a beam direction needs to be deferred, e.g. due to interference from transmission of another communications device, the transmission in another beam direction may be conducted without waiting for the other communications device to complete its transmission. This is referred to as "beam-specific" deferment, which can increase the spatial reuse efficiency brought by directional transmission using high gain beamforming, thereby ensuring fairness and efficient use of channel resources.

In yet another embodiment, the method may further comprise updating the backoff counter for the beam direction that has ever been listened to. In this way, repetitive or even endless waiting in some certain beam directions, for example those frequently subject to interference, may be avoided In a second aspect of the present disclosure, there is provided an apparatus for listening-based transmission. The apparatus is implemented at a communications device of a first type with a plurality of beams and operable on an unlicensed spectrum. Particularly, the apparatus comprises an identifying unit, an obtaining unit, a selecting unit, and a scheduling unit. The identifying unit is configured to identify a beam direction for a communications device of a second type when there is data directed to the communications device of the second type. The obtaining unit is configured to obtain a backoff counter for the identified beam direction. The selecting unit is configured to select at least one beam direction for listening. During the listening, the backoff counter corresponding to the at least one beam direction may be changed. The beam in each of the at least one beam direction covers at least one communications device of the second type having data directed thereto. The scheduling unit is configured to schedule transmission to a communications device of the second type in the identified beam direction when the backoff counter corresponding to that beam direction reaches a certain threshold.

In a third aspect of the present disclosure, there is provided an apparatus for listening-based transmission. The apparatus is implemented at a communications device of a first type with a plurality of beams and operable on an unlicensed spectrum. The apparatus comprises a processor and a memory. The memory contains instructions executable by the processor, whereby the apparatus is operative to perform the method of the first aspect of the present disclosure.

In a fourth aspect of the present disclosure, there is provided an apparatus for listening-based transmission. The apparatus is implemented at a communications device of a first type with a plurality of beams and operable on an unlicensed spectrum. The apparatus comprises processing means adapted to perform the method of any of the first aspect of the present disclosure.

In a fifth aspect of the present disclosure, there is provided a computer program product comprising instructions which, when executed on at least one processor, cause the at least one processor to carry out the method of the first aspect of the present disclosure.

BRIEF DESCRIPTION OF THE DRAWINGS

The above and other aspects, features, and benefits of various embodiments of the disclosure will become more fully apparent from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Hereinafter, the principle and spirit of the present disclosure will be described with reference to the illustrative embodiments. It should be understood, all these embodiments are given merely for the skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "an embodiment," "another embodiment," "yet another embodiment," etc., indicate that the embodiment described may include a particular feature, structure, or characteristic, but every embodiment may not necessarily include the particular feature, structure, or characteristic. Moreover, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to limit example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skill in the art to which this disclosure belongs. For example, the term "base station" used herein may refer to e.g. Access Node (AN), eNB, eNodeB, NodeB, Base Transceiver Station (BTS) or Access Point and the like, depending on the technology and terminology used. Likewise, the term "terminal device" or UE used herein may refer to any terminal having wireless communications capabilities, including but not limited to, mobile phones, cellular phones, smart phones, or personal digital assistants (PDAs), portable computers, image capture devices such as digital cameras, gaming devices, music storage and playback appliances and any portable units or terminals that have wireless communications capabilities, or Internet appliances permitting wireless Internet access and browsing and the like. Hereafter, the terms "terminal device" and "UE" may be used interchangeably and the terms "base station" and "AN" may be used interchangeably.

Figure 2:
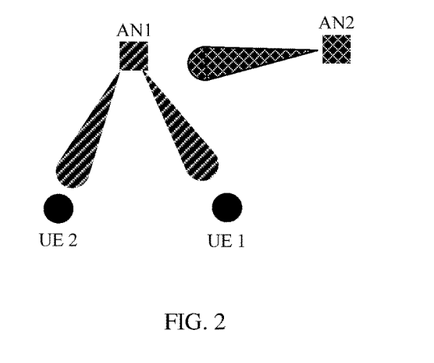
FIG. 2 shows a scenario for illustrating a possible problem when the existing LBT mechanism applied for directional transmission.

FIG. 2 shows a scenario for illustrating a possible problem when the existing LBT mechanism applied for directional transmission implemented by beamforming. As shown, AN 1 attempts to transmit towards its served UE 1 and UE 2 using directional transmission. It is assumed that AN 1 can only transmit in one direction at one time and there is an ongoing transmission initiated from AN 2 which will be interfering with the transmission from AN 1 to UE 1. Following the existing LBT protocol, AN 1 should perform random backoff to sense a channel state before starting the transmission. Since the transmission of AN 2 is interfering with AN 1, the channel state sensed by AN 1 will be busy. In this case, AN 1 will have to defer its access to the channel until the data transmission of AN 2 is finished.

Figure 3:
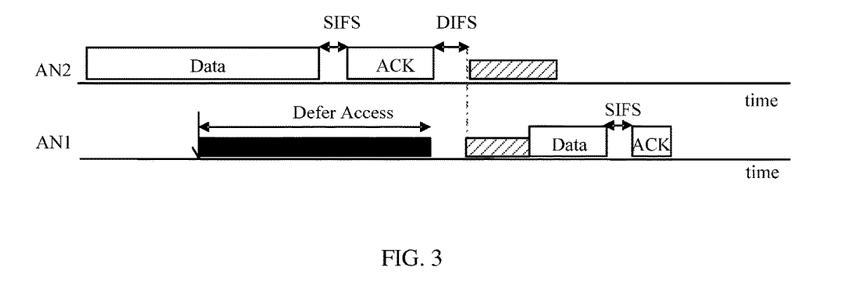
FIG. 3 illustrates timing for transmission of AN 1 and AN 2 in FIG. 2.

FIG. 3 illustrates the timing for transmission of AN 1 and AN 2 in FIG. 2. As shown, the access deferment is applied to AN 1, which means transmissions to both UE 1 and UE 2 will be deferred. In this case, even though the transmission from AN 1 to UE 2 is not interfered by the transmission of AN 2, it still has to wait for AN 2 to complete its transmission since the deferment is specific to the whole node. That is, the transmission opportunity from AN 1 to UE 2 is a waste due to this "node-specific" deferment. This type of "node-specific" deferment may decrease the spatial reuse efficiency brought by directional transmission using high gain beamforming.

Furthermore, another problem with the existing LBT mechanism when it is applied to networks with multiple beams using beamforming is how to listen in different beam directions with limited receiving radio frequency (RF) chains at the transmitter side, which is important for the overall system performance.

In order to solve at least part of the above problems, a new transmission solution based on a beam-specific LBT mechanism according to embodiments of the present disclosure will be described with reference to FIGS. 4-7.

Figure 4:
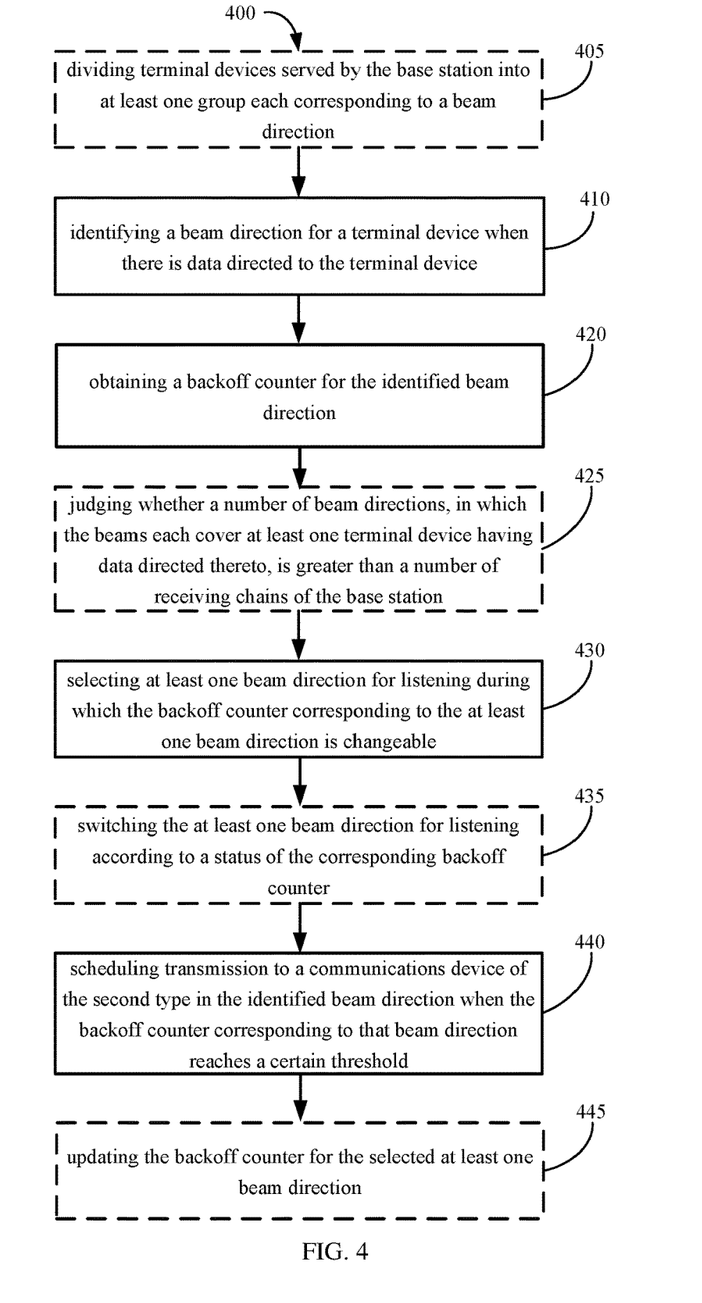
FIG. 4 illustrates a flowchart of a method for listening-based transmission according to embodiments of the present disclosure.

FIG. 4 illustrates a flowchart of a method 400 for listening-based transmission according to embodiments of the present disclosure. The method 400 may be implemented either at a base station for transmission directed to a terminal device in DL or at the terminal device for transmission directed to the base station in UL. Both the base station and the terminal device support beamforming and operating on an unlicensed spectrum. In the following description, the base station or the terminal device on which the method 400 is implemented will be referred to as a communications device of a first type with a plurality of beams and operable on an unlicensed spectrum. The other party to which the transmission is directed will be referred to as a communications device of a second type.

In FIG. 4, operations in blocks with a solid line are essential while operations in blocks with a broken line are optional depending on various embodiments of the present disclosure. The description will be started from the essential operation in block 410.

As illustrated, the method 400 enters at block 410, in which a beam direction is identified at the communications device of the first type, e.g. the base station, for a communications device of the second type, e.g. a UE connected to the base station, when there is data directed to the communications device of the second type.

As an example, in which the communications device of the first type is a base station and the communications device of the second type is a UE, there may be a beacon broadcast by the base station in the beam sweeping way with a reference signal in each beam. Then, the UE connected to the base station will measure receiving power of the reference signal and report identification (ID) of the corresponding beam in which the reference signal is received with the best receiving power. Based on the reported beam ID, the base station may identify a beam direction for the UE.

In an embodiment, before identifying the beam direction for the communications device of the second type having data directed thereto, all communications devices of the second type connected to the communications device of the first type may be divided, at block 405, into at least one group each corresponding to a beam direction. Accordingly, by determining which group the communications device of the second type that has data directed thereto belongs to, the beam direction corresponding to the determined group may be identified as the beam direction for that communications device of the second type.

As an example, in which the communications device of the first type is a base station and the communications device of the second type is a UE, multiple UEs connected to the base station may be divided into at least one group according to their measurement reports. For example, there may be a beacon broadcast by the base station in the beam sweeping way with a reference signal in each beam. Then, each of the UEs connected to the base station will measure receiving power of the reference signal and report identification (ID) of the corresponding beam in which the reference signal is received with the best receiving power. Based on the reported beam IDs, the base station may combine the UEs with the same reported beam ID into a same group.

As another example, multiple connected UEs may be divided into multiple groups, for example according to their positions. The UEs in the same or similar direction may be formed into one group.

Subsequently, at bock 420, a backoff counter is obtained for the identified beam direction.

In an embodiment, a backoff counter may be generated for the identified beam direction, if no backoff counter exists for that beam direction. Preferably, in order to avoid collision, the backoff counter may be generated randomly.

In another embodiment that there is an existing backoff counter for the identified beam direction, the backoff counter may be obtained by retrieving the existing backoff counter for that beam direction.

For example, a table may be maintained at the communications device of the first type for recording the backoff counter. Once the beam direction is identified for a communications device of the second type, the table may be checked to find whether there is already a backoff counter for that beam direction and to retrieve the corresponding backoff counter if there exists. One example of such a table is shown in Table 1.

TABLE 1

| Beam Direction ID | UE group | Generated backoff counter | Updated backoff counter |
| --- | --- | --- | --- |
| 1 | UE1, UE2 | 25 | 20 |
| 2 | UE3 | X | X |
| 3 | UE4, UE5 | 18 | 10 |

Table 1 lists correspondences between beam directions and UE groups as well as statuses of associated backoff counters. In Table 1, UE 1 and UE2 belong to a first UE group corresponding to beam direction 1; UE3 belongs to a second UE group corresponding to beam direction 2; and UE4 and UE 5 belong to a third UE group corresponding to beam direction 3. A number in the column "generated backoff counter" represents an initial value of the backoff counter generated for the corresponding beam direction, wherein "X" represents that no backoff counter exists for the corresponding beam direction. A number in the column "updated backoff counter" represents a value of the corresponding backoff counter when it was last updated, wherein "X" represents that no backoff counter exists for the corresponding beam direction.

In this example, there is data for transmission to UE1, UE4 and UE5. Since UE1 belongs to the first UE group corresponding to beam direction 1 while UE4 and UE5 belong to the third UE group corresponding to beam direction 3, the base station may easily identify beam direction 1 for UE1 and beam direction 3 for UE4 and UE5 by checking Table 1 and determining the groups to which UE 1, UE 4 and UE 5 belong. After further checking Table 1, the base station may find out that there already exist backoff counters for beam directions 1 and 3, and then retrieve the backoff counter with a value 20 for the identified beam direction 1 and retrieve the backoff counter with a value 10 for the identified beam direction 3. As for UE3, if there is data directed to it, the base station may identify beam direction 2 for UE3 and find out that no backoff counter exists for beam direction 3. In this case, the base station may generate a backoff counter with a random value for beam direction 3.

Once the backoff counter is obtained for the identified beam direction, at least one beam direction will be selected at block 430 for listening. During the listening, the backoff counter corresponding to the at least one beam direction may be changed, e.g. decreased. The beam in each of the selected at least one beam direction covers at least one communications device of the second type that has data directed thereto. Note that, "the beam in a beam direction" may be regarded as a beam direction with a certain width and thus the expression "the beam in a beam direction covers a communications device of the second type" and similar expressions will be simplified as the expression "a beam direction covers a communications device with the second type" and the like in this document.

In an embodiment, the at least one beam direction may be selected for listening based on priorities of beam directions each covering at least one communications device of the second type that has data directed thereto. The higher the priority of a beam direction is, the more possible that beam direction is selected.

The priority of a beam direction may be determined based on any one or any combination of the following:

A QoS requirement of a group of communications devices of the second type corresponding to the beam direction. In an example that the communications device of the second type is a UE, if a UE group corresponding to the beam direction has a delay sensitive service, this group will have a higher priority. Looking back to Table 1, if data directed to UE4 is delay sensitive, then beam direction 3 will have a higher priority than beam direction 1.

Historical scheduling information for the group of communications devices of the second type corresponding to the beam direction. For example, if data transmission for a UE group is scheduled more often for a previous time, the beam direction corresponding to this UE group has a lower priority. Looking back to Table 1, if data transmission for UE1 is scheduled for more times than UE4 and UE5, then beam direction 1 has a lower priority than beam direction 3.

A channel quality of the beam in the beam direction. Generally, a higher channel quality means that the beam direction has a higher priority.

A value of the backoff counter corresponding to the beam direction. Generally, a smaller value of the backoff counter means that the corresponding beam direction has a higher priority.

A time when the communications device of the second type in the beam direction requests data. Generally, the communications device which requests data at the earlier time will have a higher priority.

In another embodiment, before the at least one beam direction is selected for listening, it may be judged at block 425 whether a number of pending beam directions each covering at least one communications device of the second type that has data directed thereto, is greater than a number of receiving RF chains of the communications device of the first type. If the number of the pending beam directions is greater than the number of the receiving RF chains, then a number of the selected at least one beam direction is equal to the number of the receiving RF chains; otherwise the number of the selected at least one beam direction is equal to the number of the pending beam directions.

In an example as shown with Table 1, assuming that the communications of the first type is a base station having more than two RF chains for reception, then the base station may select both beam direction 1 and beam direction 3 simultaneously for listening. If the base station has only one RF chain for reception, the base station may select only one of beam directions 1 and 3 with the highest priority for listening.

In a further embodiment, if the number of the pending beam directions is greater than the number of the RF chains, the communications device of the second type may obtain a deferring time period for a beam direction of the selected at least one beam direction by performing virtual carrier sensing. The virtual carrier sensing is a well-known technique for collision avoidance, which is defined in 802.11 standards and will not be detailed herein for the sake of brevity. During this deferring time period, the listening for the beam direction is suspended. Then the communications device of the second type may switch at block 435 to listen to another beam direction among at least one unselected beam direction each covering at least one communications device of the second type that has data directed thereto during at least the deferring time period. The other beam direction has a highest priority among the at least one unselected beam direction.

Subsequently at block 440, transmission to a communications device of the second type in the identified beam direction is scheduled when the backoff counter corresponding to that beam direction reaches a certain threshold, for example, when the backoff counter is decreased to 0.

Figure 5:
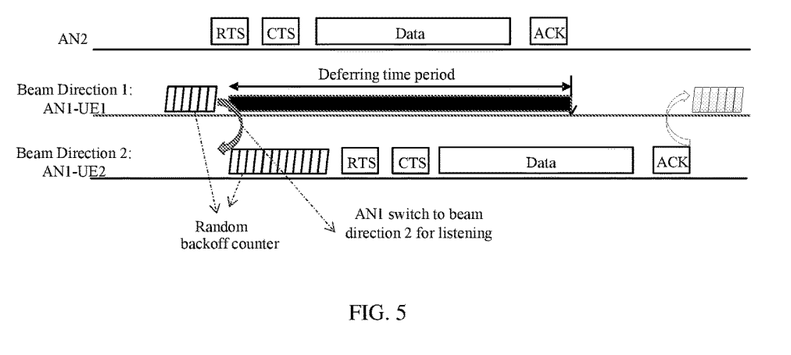
FIG. 5 shows a specific example of switching beam directions for listening according to an embodiment of the present disclosure.

FIG. 5 shows a specific example of switching beam directions for listening according to an embodiment of the present disclosure.

In this example, it is assumed that AN 1 has only one receiving RF chain; both UE 1 and UE 2 have data directed thereto; and beam direction 1 corresponding to UE 1 has a higher priority than beam direction 2 corresponding to UE 2. According to method 400, AN 1 first selects beam direction 1 for listening. Upon decoding the Request to Send (RTS) from AN 2, AN 1 is aware that there will be transmission of AN 2 that will interfere with the transmission from AN 1 to UE 1. Thus, the directional transmission from AN 1 to UE 1 will have to be deferred by AN 1. Accordingly, a deferring time period may be obtained for beam direction 1. During this deferring time period, the listening for beam direction 1 is suspended and meanwhile beam direction 2 corresponding to UE2 will be selected for listening. If the backoff counter for beam direction 1 has already started before the deferment, this backoff counter may be held during the deferring time period. In this case, if the table for recording the backoff counter like Table 1 is used, the backoff counter will be updated at the time when the backoff counter is held and its updated value will be recorded in the table.

After the transmission from AN 1 to UE 2 in beam direction 2 completes, AN 1 may switch back to beam direction 1 for continuing the listening, since beam direction 1 has a higher priority.

Alternatively, if AN 1 is not transmitting when the deferring time period ends, AN 1 may prioritize the beam directions again and select the beam direction with the highest priority for listening.

In this way, different from the scenario as shown in FIG. 2, the transmission to UE 2 does not need to be deferred and contrarily, may be conducted without waiting for AN 2 to complete its transmission. This is referred to as "beam-specific" deferment, which can increase the spatial reuse efficiency brought by directional transmission using high gain beamforming, thereby ensuring the maximum channel capacity, fairness and QoS.

Additionally and preferably, the backoff counter for the beam direction that has ever been listened to may be updated at block 445. As listed in Table 1, the updated backoff counter is recorded so that the communications device of the first type may obtain the latest value of the backoff counter, which may avoid repetitive or even endless waiting in some beam directions, for example those beam directions that are frequently interfered by transmissions from an adjacent communications device.

By virtue of method 400 according to various embodiments of the present disclosure, the networks or systems with a plurality of beams, i.e. utilizing high gain beamforming and operable on the unlicensed spectrum may make the best use of the transmission opportunities in different beam directions without modifying too much of the traditional LBT protocol.

For the purpose of illustration only, FIG. 4 shows the method 400 in a certain order. However, those skilled in the art shall appreciate that the order for performing the method 400 is not limited thereby. Instead, some operations may be performed in parallel or in a reverse order. For example, the operation in block 425 may be performed in parallel with or before the operation in block 410 or 420; and the operations in blocks 440 and 445 may be performed in parallel or in a reverse order.

Figure 6:
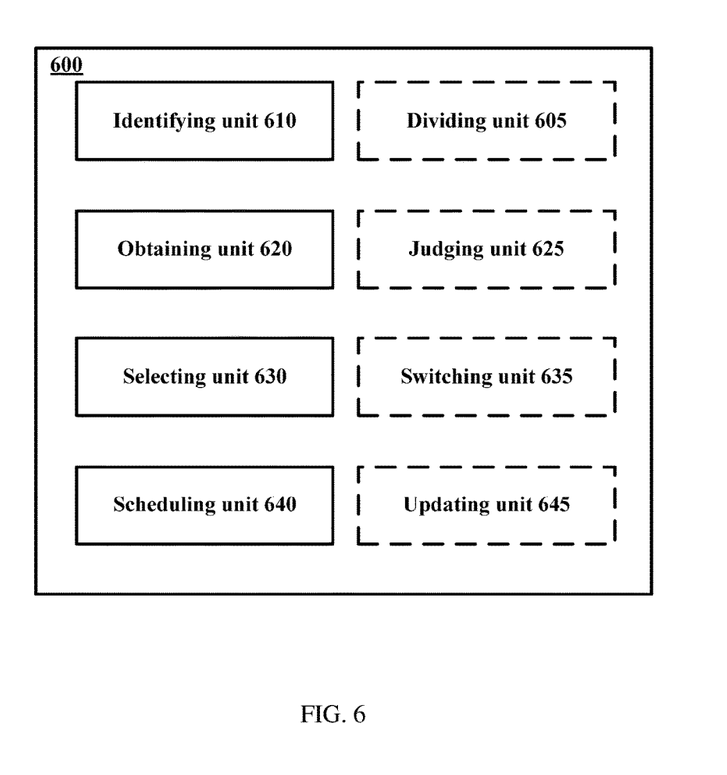
FIG. 6 illustrates a schematic block diagram of an apparatus for listening-based transmission according to embodiments of the present disclosure.

FIG. 6 illustrates a schematic block diagram of an apparatus 600 for listening-based transmission according to embodiments of the present disclosure. The apparatus 600 may be implemented at a base station for transmission directed to a terminal device in DL or at the terminal device for transmission directed to the base station in UL. Both the base station and the terminal device support beamforming and operating on an unlicensed spectrum. In the following description, the base station or the terminal device at which the apparatus 600 is implemented will be referred to as a communications device of a first type with a plurality of beams and operable on an unlicensed spectrum. The other party to which the transmission is directed will be referred to as a communications device of a second type.

In FIG. 6, various units in blocks with a solid line are essential while units in blocks with a broken line are optional depending on various embodiments of the present disclosure.

Particularly, the apparatus 600 comprises an identifying unit 610, an obtaining unit 620, a selecting unit 630, and a scheduling unit 640.

The identifying unit 610 is configured to identify a beam direction for a communications device of a second type when there is data directed to the communications device of the second type. The obtaining unit 620 is configured to obtain a backoff counter for the identified beam direction. The selecting unit 630 is configured to select at least one beam direction for listening. During the listening, the backoff counter corresponding to the at least one beam direction may be changed. The beam in each of the at least one beam direction covers at least one communications device of the second type having data directed thereto. The scheduling unit 640 is configured to schedule transmission to a communications device of the second type in the identified beam direction when the backoff counter corresponding to that beam direction reaches a certain threshold.

In an embodiment, the obtaining unit 620 may be configured to generate a backoff counter for the identified beam direction, if no backoff counter exists for that beam direction and otherwise, to retrieve the existing backoff counter for the identified beam direction.

In a further embodiment, the apparatus 600 may further comprise a dividing unit 605 that may be configured to divide communications devices of the second type connected to the communications device of the first type into at least one group each corresponding to a beam direction. In this embodiment, the identifying unit 610 may further be configured to identify the beam direction for the communications device of the second type by determining the group to which that communications device of the second type belongs.

In another embodiment, the selecting unit 630 may be configured to select the at least one beam direction for listening based further on priorities of beam directions each covering at least one communications device of the second type that has data directed thereto.

In a further embodiment, the priority of a beam direction may be determined based on any one or any combination of: a quality of service requirement of a group of communications devices of the second type corresponding to that beam direction; historical scheduling information for the group of communications devices of the second type corresponding to that beam direction; a channel quality of the beam in that beam direction; a value of the backoff counter corresponding to that beam direction; and a time when the communications device of the second type in that beam direction requests data.

In yet another embodiment, the apparatus may further comprise a judging unit 625 configured to judge whether a number of pending beam directions each covering at least one communications device of the second type that has data directed thereto, is greater than a number of receiving radio frequency chains of the communications device of the first type. In this embodiment, if the number of said pending beam directions is greater than the number of the receiving radio frequency chains, then a number of the selected at least one beam direction is equal to the number of the receiving radio frequency chains; otherwise the number of the selected at least one beam direction is equal to the number of said beam directions.

In yet another embodiment, the apparatus 600 may further comprise a switching unit 635 that is configured to obtain a deferring time period for a beam direction of the selected at least one beam direction by performing virtual carrier sensing, if the number of said pending beam directions is greater than the number of the receiving radio frequency chains During the deferring time period, the listening for the beam direction is suspended. The switching unit 635 may further be configured to switch to listen to another beam direction among at least one unselected beam direction each covering at least one communications device of the second type that has data directed thereto during at least the deferring time period. The other beam direction has a highest priority among the at least one unselected beam direction.

In yet another embodiment, the apparatus 600 may further comprise an updating unit 645 that is configured to update the backoff counter for the beam direction that has ever been listened to.

The above units 605-645 may be configured to implement the corresponding operations or steps as described above in relation to the method 400 and thus will not be detailed herein for the sake of brevity.

Figure 7:
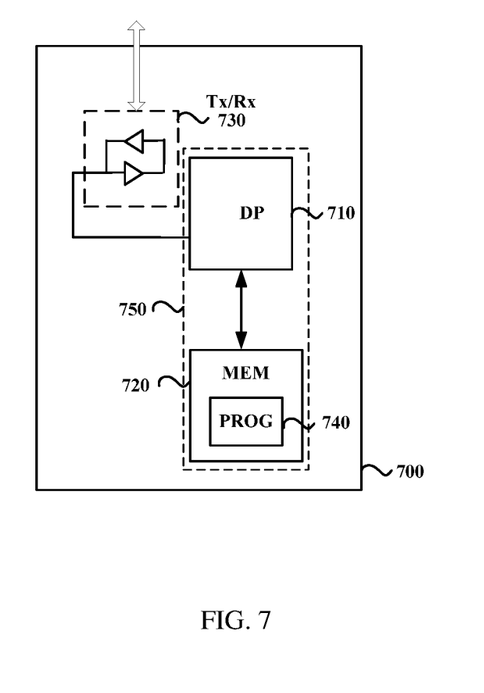
FIG. 7 illustrates a simplified block diagram of another apparatus according to embodiments of the present disclosure.

FIG. 7 illustrates a simplified block diagram of an apparatus 700. The apparatus 700 may be embodied at or as at least part of a base station for transmission directed to a terminal device in DL. The apparatus 700 may alternatively embodied at or as at least a part of a terminal device for transmission directed to a base station in UL. Both the base station and the terminal device support a plurality of beams and are operable on an unlicensed spectrum.

Particularly, the apparatus 700 comprises at least one processor 710, such as a data processor (DP) and at least one memory (MEM) 720 coupled to the processor 710. The apparatus 700 may further comprise a transmitter TX and receiver RX 730 coupled to the processor 710 for establishing communications with other apparatuses. The MEM 720 stores a program (PROG) 740. The PROG 740 may include instructions that, when executed on the associated processor 710, enable the apparatus 700 to operate in accordance with the embodiments of the present disclosure, for example to perform the method 400, depending on the specific implementation of the apparatus 700. A combination of the at least one processor 710 and the at least one MEM 720 may form a processing means 750 that is adapted to implement the embodiments of the present disclosure.

The MEM 720 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 710 may be of any type suitable to the local technical environment, and may include one or more of general purpose computers, special purpose computers, microprocessors, digital signal processors (DSPs) and processors based on multicore processor architecture, as non-limiting examples.

Further, the present disclosure may also provide a computer program product comprising instructions that when executed by a processing unit in a base station or terminal device causes the base station or terminal device to perform the method 400.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method at a communications device of a first type and operable on an unlicensed spectrum, the method comprising:
    identifying a beam direction of a beam for a communications device of a second type when there is data directed to the communications device of the second type;
    obtaining a backoff counter for the beam direction;
    listening simultaneously to a number of beam directions including the beam direction, wherein the number of beam directions is more than one and is selected based on a number of pending beam directions and a number of receiving radio frequency chains of the communications device of the first type, each pending beam direction covering at least one communications device of the second type to which the communications device of the first type has data to be transmitted, and the number of beam directions is selected to be:
        equal to the number of receiving radio frequency chains if the number of pending beam directions is greater than the number of receiving radio frequency chains, or
        equal to the number of pending beam directions otherwise,
        wherein another backoff counter for another beam direction of the number of beam directions is updated, and wherein the another beam direction has been listened to; and
    scheduling transmission to the communications device of the second type in the beam direction when the backoff counter corresponding to the beam direction reaches a certain threshold.

2. The method according to claim 1, wherein obtaining the backoff counter for the beam direction comprises:
    generating the backoff counter for the beam direction, if no backoff counter exists for the beam direction;
    otherwise retrieving the backoff counter for the beam direction.

3. The method according to claim 1, further comprising, before identifying the beam direction for the communications device of the second type:

dividing communications devices of the second type connected to the communications device of the first type into groups, each corresponding to a respective beam direction, wherein the beam direction for the communications device of the second type is identified by determining a group to which the communications device of the second type belongs.

4. The method according to claim 1, wherein the number of beam directions for listening is selected based further on priorities of beam directions, each beam direction covering corresponding one or more communications devices of the second type.

5. The method according to claim 4, wherein a determination of the priorities is based on at least one of:

for one beam direction covering the corresponding one or more communications devices of the second type,
- a quality of service requirement of a group of one or more communications devices of the second type corresponding to the one beam direction,
- historical scheduling information for the group of one or more communications devices of the second type corresponding to the one beam direction,
- a channel quality of a corresponding beam in the one beam direction,
- a backoff counter value corresponding to the one beam direction, and
- a time when one communications device of the second type in the one beam direction issues a data request.

6. The method according to claim 1, further comprising, if the number of the pending beam directions is greater than the number of the receiving radio frequency chains:

obtaining a deferring time period for the beam direction of the selected number of the beam directions by performing virtual carrier sensing, wherein the listening is suspended during the deferring time period; and switching to listen to another beam direction among at least one unselected beam direction, each unselected beam direction covering one or more communications devices of the second type for data transmission during at least the deferring time period, wherein the other beam direction has a highest priority among the at least one unselected beam direction.

7. An apparatus at a communications device of a first type and operable on an unlicensed spectrum, the apparatus comprising:

a processor and a non-transitory computer readable storage medium containing instructions, which when executed on the processor, causing the apparatus to:

identify a beam direction of a beam for a communications device of a second type when there is data directed to the communications device of the second type, obtain a backoff counter for the beam direction, listen simultaneously to a number of beam directions including the beam direction, wherein the number of the beam directions is more than one and is selected based on a number of pending beam directions and a number of receiving radio frequency chains of the communications device of the first type, each pending beam direction covering at least one communications device of the second type to which the communications device of the first type has data to be transmitted, and the number of beam directions is selected to be:

equal to the number of receiving radio frequency chains if the number of pending beam directions is greater than the number of receiving radio frequency chains, or equal to the number of pending beam directions otherwise, wherein another backoff counter for another beam direction of the number of beam directions is updated, and wherein the another beam direction has been listened to, and schedule transmission to the communications device of the second type in the beam direction when the backoff counter corresponding to the beam direction reaches a certain threshold.

8. The apparatus according to claim 7, the apparatus is to:

generate the backoff counter for the beam direction, if no backoff counter exists for the beam direction, otherwise retrieve the backoff counter for the beam direction.

9. The apparatus according to claim 7, the apparatus is further to:

divide communications devices of the second type connected to the communications device of the first type into groups, each corresponding to a respective beam direction, wherein the beam direction is to be identified for the communications device of the second type by determining a group to which the communications device of the second type belongs.

10. The apparatus according to claim 7, the apparatus is further to select the number of beam directions for listening based further on priorities of beam directions, each beam direction covering corresponding one or more communications devices of the second type.

11. The apparatus according to claim 10, wherein a determination of the priorities is based on at least one of:

for one beam direction covering the corresponding one or more communications devices of the second type,
- a quality of service requirement of a group of one or more communications devices of the second type corresponding to the one beam direction,
- historical scheduling information for the group of one or more communications devices of the second type corresponding to the one beam direction,
- a channel quality of a corresponding beam in the one beam direction,
- a backoff counter value corresponding to the one beam direction, and
- a time when one communications device of the second type in the one beam direction issues a data request.

12. The apparatus according to claim 7, wherein the apparatus is further to, if the number of the pending beam directions is greater than the number of the receiving radio frequency chains:

obtain a deferring time period for the beam direction of the selected number of the beam directions by performing virtual carrier sensing, wherein the listening is suspended during the deferring time period; and switch to listen to another beam direction among at least one unselected beam direction, each unselected beam direction covering one or more communications devices of the second type for data transmission during at least the deferring time period, wherein the other beam direction has a highest priority among the at least one unselected beam direction.

13. A non-transitory computer readable storage medium, comprising instructions which, when executed on at least one processor, cause the at least one processor to perform operations at a communications device of a first type and operable on an unlicensed spectrum, the operations comprising:

identifying a beam direction of a beam for a communications device of a second type when there is data directed to the communications device of the second type;

obtaining a backoff counter for the beam direction;

listening simultaneously to a number of beam directions including the beam direction, wherein the number of the beam directions is more than one and is selected based on a number of pending beam directions and a number of receiving radio frequency chains of the communications device of the first type, each pending beam direction covering at least one communications device of the second type to which the communications device of the first type has data to be transmitted, and the number of beam directions is selected to be:

equal to the number of receiving radio frequency chains if the number of pending beam directions is greater than the number of receiving radio frequency chains, or equal to the number of pending beam directions otherwise, wherein another backoff counter for another beam direction of the number of beam directions is updated, and wherein the another beam direction has been listened to; and scheduling transmission to the communications device of the second type in the beam direction when the backoff counter corresponding to the beam direction reaches a certain threshold.

* * * * *